J. L. TAYLER.
Car-Brake.
No. 215,409. Patented May 13, 1879.
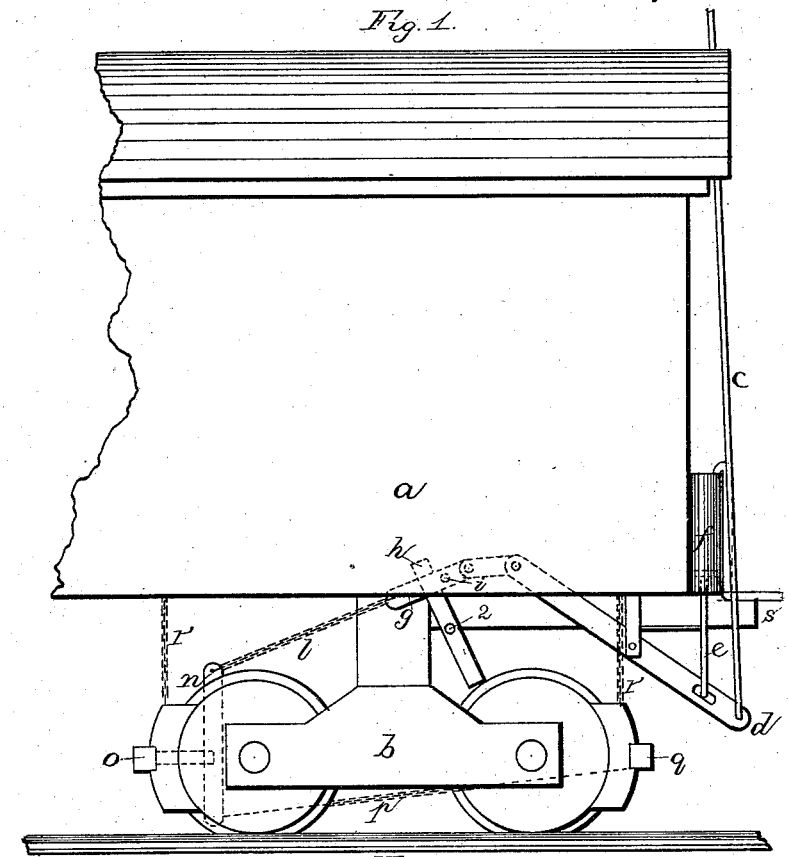
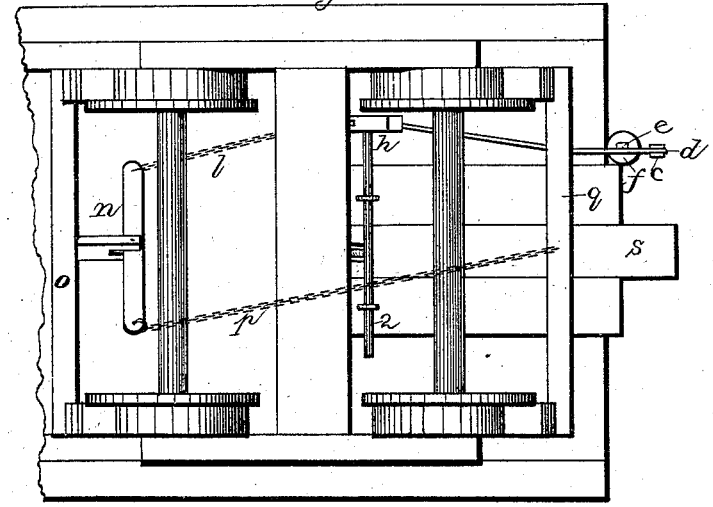
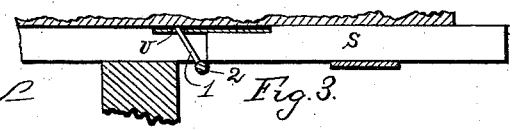
Witnesses:
J. W. Garner
W. S. D. Haines
Inventor:
Jno. L. Tayler,
per
F. A. Lehmann,
atty

UNITED STATES PATENT OFFICE.

JOHN L. TAYLER, OF OSKALOOSA, IOWA.

IMPROVEMENT IN CAR-BRAKES.

Specification forming part of Letters Patent No. 215,409, dated May 13, 1879; application filed April 2, 1879.

*To all whom it may concern:*

Be it known that I, JNO. L. TAYLER, of Oskaloosa, in the county of Mahaska and State of Iowa, have invented certain new and useful Improvements in Car-Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in railroad-brakes; and it consists in the arrangement and combination of parts, whereby a powerful and effective brake is produced, as will be more fully described hereinafter.

Figure 1 is a side elevation of my invention. Fig. 2 is an inverted view, and Fig. 3 is a detail view, of the draw-bar and connections.

$a$ represents the body of the car, and $b$ the truck.

Extending down from the top of the car is the rod $c$, which has its lower end pivoted to the outer end of the lever $d$. This lever $d$ is pivoted in a hanger, which projects downward from the under side of the car, and also has the rod $e$ of the piston, that works in the cylinder $f$, fastened to it. To the rear end of this lever is fastened the cranked lever $g$, which has a stop, $i$, formed upon it, to prevent it from moving too far back through the slotted lever $h$.

To the rear end of the lever $g$ is fastened a connecting rod or chain, $l$, which connects it to the lever $n$, that is pivoted near its center upon the shoe-bar $o$, just in the rear of the second axle of the truck.

To the lower end of the lever $n$ is fastened a second connecting rod or chain, $p$, which has its front end fastened to the bar $q$ of the second pair of brake-shoes. These brakes are suspended from the under side of the body of the car by means of the rods or chains $r$, and operate against the wheels of the truck in the usual manner.

When the outer end of the lever $d$ is depressed either by the rod $c$, by the brakeman, or by compressed air admitted into the top of the cylinder $f$, so as to force the piston downward, the rear end of the lever, acting through the cranked lever $g$ and rod or chain $l$, draws the upper end of the lever $n$ forward and throws its lower end backward. This movement of the lever $n$ draws the two pairs of shoes tightly against the wheels.

To the rear end of the draw-bar $s$ is secured a slotted plate, $v$, which passes over an inclined arm, 1, that projects rearwardly from the rod 2. On the end of this partially-revolving rod 2 is secured the slotted lever $h$. By thus connecting the draw-head with the brake, as shown in Fig. 3, the draw-heads are made to apply the brakes to the wheel, or loosen them from the wheels, by the motion of the cars.

When the cars are all moving evenly along, the draw-heads are drawn outward, and, in pulling upon the brakes, keep them from the wheels; but should the engineer reverse the engine, or apply the brake on the engine, the slackening of the speed causes the cars to crowd together, and thus force the draw-bars backward and apply the brakes to the wheels. By this construction the slack of the train is made to operate the brakes, and thus enable the train to be stopped much more quickly than where the brakes are applied in the usual manner.

When the engineer wishes to give the conductor the control of the train, the air is turned into the cylinders $f$ from the reservoir on the locomotive, thereby reversing the brakes, so that it is only necessary for the last brake on the rear car to be applied, and this applies every other brake on the train.

Having thus described my invention, I claim—

1. In a car-brake, the combination of the cylinder $f$, connecting-rod $e$, lever $d$, rod $g$, lever $n$, chains $l\ r$, and brakes, substantially as shown.

2. The combination of the rod $c$, lever $d$, rod $g$, having the stud $i$, arm or lever $h$, shaft 2, lever 1, and plate $v$ on the draw-head, with the brakes, whereby the brakes may be operated either from the tops of the cars or by the draw-heads, substantially as set forth.

In testimony that I claim the foregoing I have hereunto set my hand this 29th day of March, 1879.

JOHN L. TAYLER.

Witnesses:
H. C. HUNTSMAN,
W. W. HASKELL.